US009643765B2

(12) United States Patent
Pivonka

(10) Patent No.: US 9,643,765 B2
(45) Date of Patent: May 9, 2017

(54) BUCKLE RETRACTION DEVICE

(71) Applicant: Troy Pivonka, Fort Collins, CO (US)

(72) Inventor: Troy Pivonka, Fort Collins, CO (US)

(*) Notice: Subject to any disclaimer, the term of this patent is extended or adjusted under 35 U.S.C. 154(b) by 0 days.

(21) Appl. No.: 14/668,987

(22) Filed: Mar. 26, 2015

(65) Prior Publication Data
US 2015/0306988 A1 Oct. 29, 2015

Related U.S. Application Data
(60) Provisional application No. 61/983,442, filed on Apr. 23, 2014.

(51) Int. Cl.
  *B60N 2/26* (2006.01)
  *B65D 63/10* (2006.01)
  *B60N 2/28* (2006.01)
  *B60R 22/02* (2006.01)

(52) U.S. Cl.
  CPC ......... *B65D 63/109* (2013.01); *B60N 2/2812* (2013.01); *B60N 2002/2815* (2013.01); *B60R 2022/021* (2013.01)

(58) Field of Classification Search
  CPC . B60N 2/265; B60R 2022/1806; B60R 22/26; B65D 63/109
  USPC ........................................................ 24/301
  See application file for complete search history.

(56) References Cited

U.S. PATENT DOCUMENTS

| 4,429,916 A * | 2/1984 | Hyde | B60R 22/105 |
| | | | 297/256.15 |
| 5,459,903 A * | 10/1995 | Treacy | A61J 9/0638 |
| | | | 24/115 G |
| 5,611,118 A * | 3/1997 | Bibbee | A42B 7/00 |
| | | | 2/195.1 |
| 5,896,623 A * | 4/1999 | Martin | F16L 3/233 |
| | | | 24/115 G |
| 5,956,812 A * | 9/1999 | Moennig | A45F 5/02 |
| | | | 24/3.13 |
| 6,161,314 A * | 12/2000 | Kamrin | A43B 3/30 |
| | | | 24/115 H |
| 6,442,762 B1 * | 9/2002 | Neumann | A42B 7/00 |
| | | | 132/58 |
| 6,543,722 B1 * | 4/2003 | Parrow | B60N 2/2806 |
| | | | 244/122 R |
| 6,883,694 B2 * | 4/2005 | Abelow | G06F 1/163 |
| | | | 224/666 |
| 2005/0109361 A1 * | 5/2005 | Klug | A45D 8/34 |
| | | | 132/275 |
| 2007/0095870 A1 * | 5/2007 | Griffith | A45C 13/30 |
| | | | 224/219 |
| 2007/0220717 A1 * | 9/2007 | Brinson | A41F 19/00 |
| | | | 24/298 |

(Continued)

Primary Examiner — David Upchurch
(74) Attorney, Agent, or Firm — Craig R. Miles; CR Miles P.C.

(57) ABSTRACT

Car seat harness buckle retract system which by encircling the harness buckle that includes a cord lock with a length of elastic cord, where both ends pass through the cord lock to present a loop to encircle the harness buckle at the base wherein the loop is adjusted to secure the harness buckle. The other end is attached to the material or the like near the harness adjust opening of the car seat. This is then adjusted by releasing and adjusting the cord lock device to prevent the harness buckle from resting in the bottom of car seat.

10 Claims, 4 Drawing Sheets

(56) References Cited

U.S. PATENT DOCUMENTS

| | | | |
|---|---|---|---|
| 2010/0325842 A1* | 12/2010 | Rivera | G09F 21/02 24/3.4 |
| 2012/0005867 A1* | 1/2012 | Whaley | A47C 21/022 24/302 |
| 2012/0088214 A1* | 4/2012 | Brodbeck | A63B 69/12 434/254 |
| 2013/0180083 A1* | 7/2013 | Walker | A63H 37/00 16/428 |
| 2014/0082894 A1* | 3/2014 | Walker | B60N 2/2812 24/303 |
| 2014/0283301 A1* | 9/2014 | Whaley | A47C 21/022 5/496 |

* cited by examiner

BUCKLE RETRACTION DEVICE

I. FIELD OF THE INVENTION

The present invention relates to buckle retraction device.

II. BACKGROUND

Placing an infant in a car seat and attaching the car seat harness buckle can be very problematic. The car seat harness buckle will always rest in the bottom of the seat and Once the child is placed in the seat the child will then have to be lifted so it can be retrieved. This becomes even more of an issue as the child gets older and heavier. There have been magnetic systems proposed (US 20140082894 A1) for retaining harness buckles but the user has to manually place the harness buckle on the magnet. The present invention will automatically retract the harness buckle so the child does not sit on the harness buckle. The present invention can be used on any harness buckle material type. The device could be permanently integrated into the car seat.

III. SUMMARY OF THE INVENTION

The present invention is a device that will automatically retract the harness buckle of a car seat.

IV. DESCRIPTION OF THE DRAWINGS

V. DETAILED DESCRIPTION OF THE INVENTION

The present invention is a device that will automatically retract the harness buckle of a car seat wherein the harness buckle retraction device is: i.) a loop that encircles and captures the buckle, ii.) a elastic cord, iii.), a clip for attachment, iv.) a cord lock.

Figure 1:
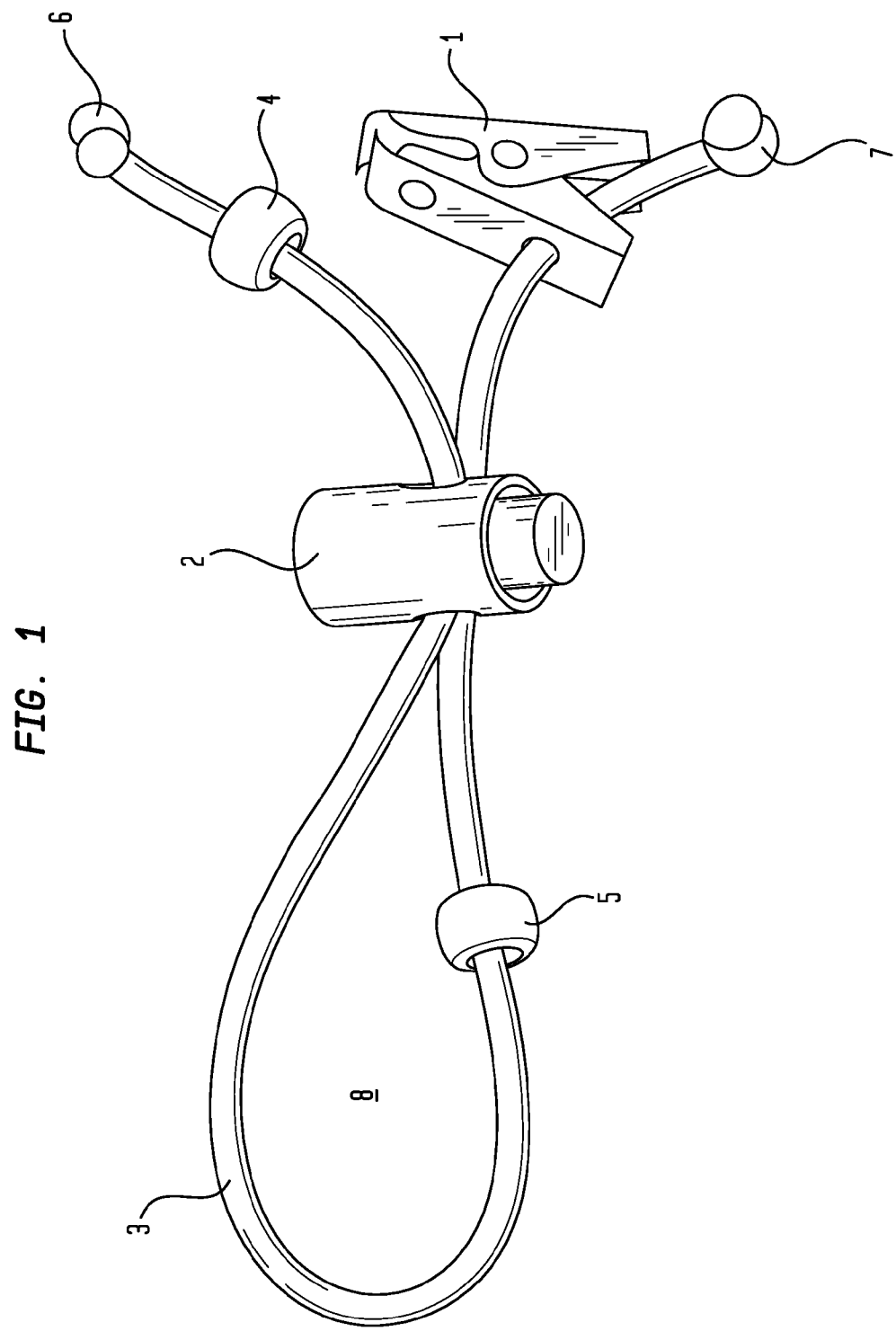
FIG. 1 is a view of the car seat harness buckle retraction device of the present invention.

FIG. 1 there is shown a device with a cord 3 that is one continuous piece that is inserted through bead 4, an adjustable cord locking device 2, bead 5, and back through cord locking device 2, and clip 1. The adjustable cord locking device 2 is retained by bead 4, bead 5, and clip 1. The cord 3 is retained in the cord locking device 2 by retaining bead 4, bead 5, and clip 1. The retaining bead 4 is held captive by knot 6. Clip 1 is retained by knot 7.

How it Works

In more detail, still referring to the invention of FIG. 1, clip 1 is attached to the material or the like near the car seat harness adjust opening (10). Cord loop 8 is placed around the car seat harness buckle. While holding adjustable cord locking device 2, pull on cord using bead 4 until the harness buckle is not resting in the bottom of the car seat.
Relative Sizes or Proportions or Conditions In further detail, still referring to the invention of FIG. 1, cord 3 is 10 to 14 inches long to sufficiently have enough length for the loop attachment 8 around the harness buckle.
Materials, Dimensions, Other Parameters The construction details of the invention as shown in FIG. 1 the clip 1 may be made of plastic or any other sufficiently strong material such as metal and the like. The cord locking device 2 may be made of plastic or other sufficiently strong material. The cord 3 can be made of elastic cord and the like that is sufficiently strong.

Figure 2:
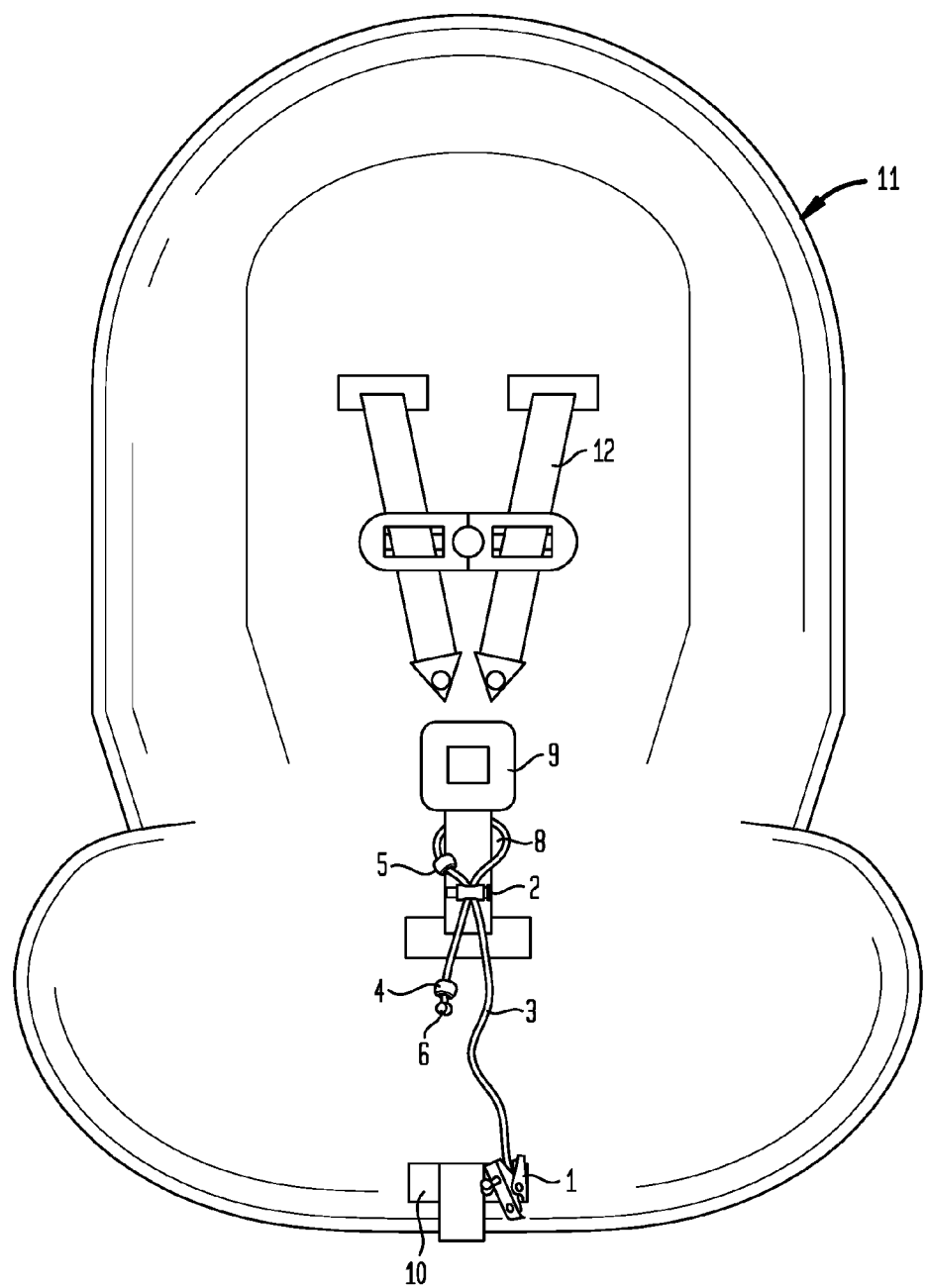
FIG. 2 shows a front view of a car seat harness buckle retraction device for the present invention when installed in a car seat 1, 2.

FIG. 2 shows a front view of infant car seat 11 with a harness buckle retraction device of the present invention. Clip 1 is attached near the bottom of the car seat 11. Cord loop 3 is placed around the base of the car seat harness buckle 9. Hold adjustable cord lock 2 pull on bead 4 until the harness buckle is not resting in bottom of car seat 11.

Figure 3:
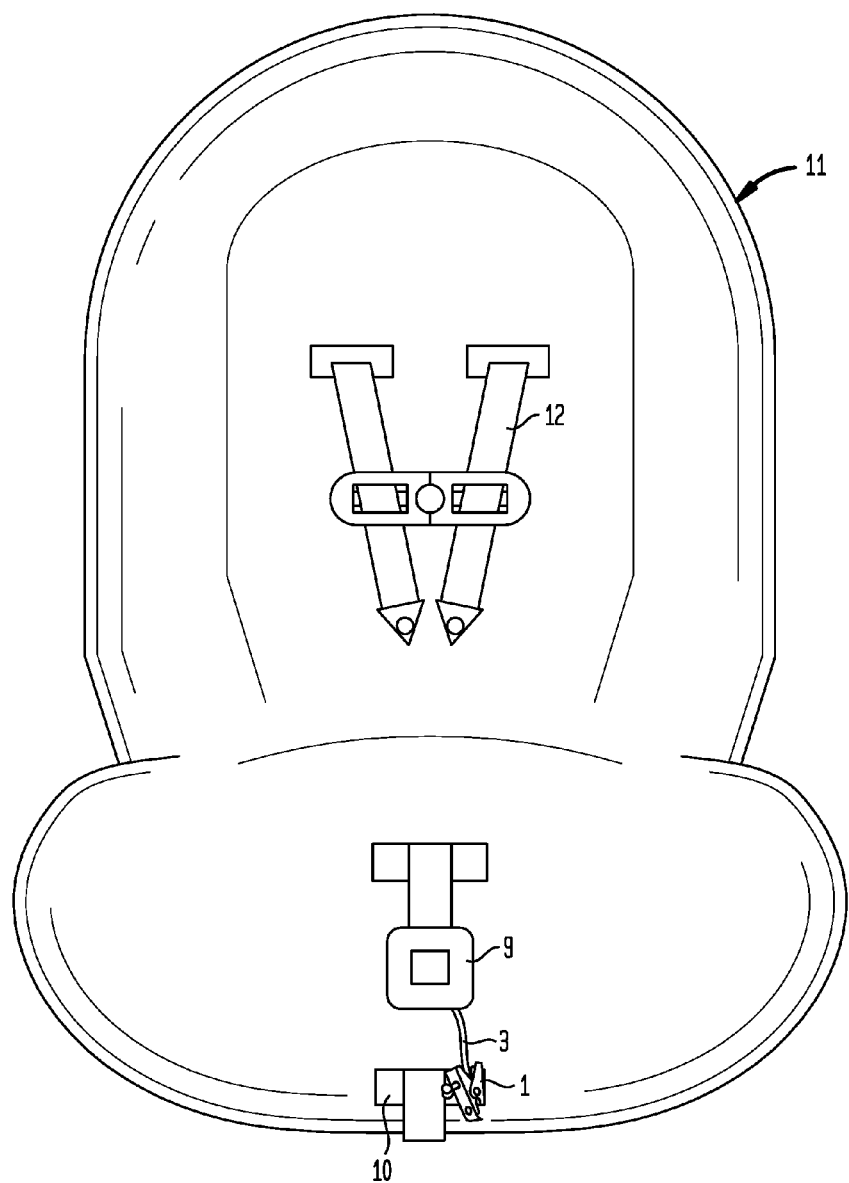
FIG. 3 shows a front view of a car seat harness buckle retraction device for the present invention when harness buckle 1 is retracted; not sitting in the bottom of the seat.

FIG. 3 shows harness buckle not resting in the bottom of car seat 11. This is the harness buckle 9 retracted position when disengaged from shoulder straps 12.

Figure 4:
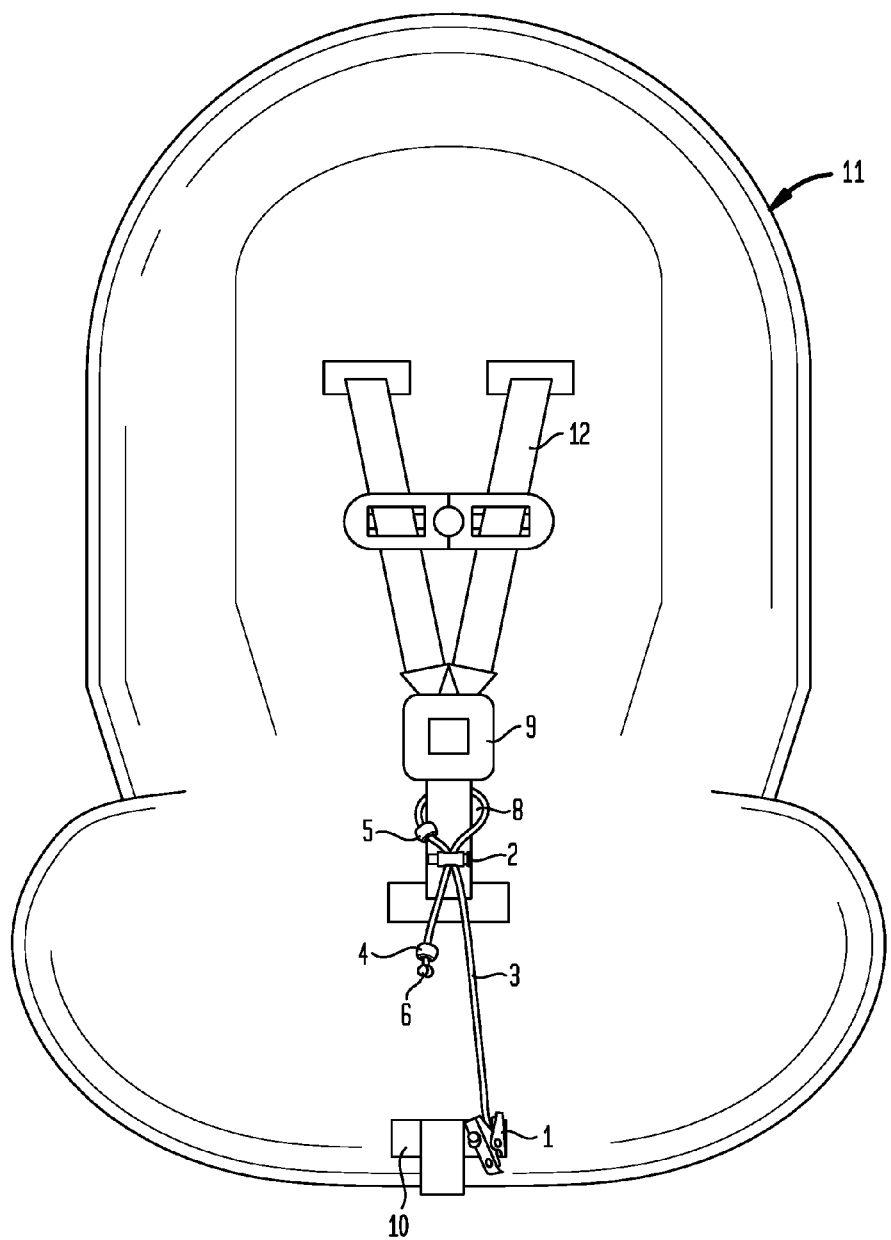
FIG. 4 shows a front view of a car seat harness buckle retraction device for the present invention when harness buckle 1 is engaged to the shoulder straps.

FIG. 4 shows harness buckle 9 when engaged to shoulder straps 12.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. An infant car seat harness retraction system, comprising:
    a cord locking device having one locking aperture;
    an elastic cord having an elastic cord medial portion disposed between uncoupled elastic cord first and second ends;
    a first bead slidely engaged on said elastic cord medial portion, said elastic cord first and second ends passed through said one locking aperture of said cord locking device to form a cord loop in said elastic cord medial portion, said cord loop adjustable by drawing said uncoupled elastic cord first or second ends through said one locking aperture, said first bead sufficiently large to prevent passage of said cord loop through said one locking aperture;
    a second bead slidely engaged on said elastic cord first end;
    said system further consisting of only one clip, said clip coupled to said elastic cord second end; and
    an infant car seat including a seat and a harness, said harness including shoulder straps which removably engage a harness buckle, said cord loop encircling said harness buckle, said clip attached to said seat.

2. The system of claim 1, further comprising a first knot in said elastic cord first end and a second knot in said elastic cord second end to retain said second bead slidely engaged on said elastic cord first end and to retain said clip coupled to said elastic cord second end.

3. The system of claim 1, wherein said shoulder straps engaged to said harness buckle stretches said elastic cord second end to draw said harness buckle away from said shoulder straps upon said shoulder straps being disengaged from said harness buckle.

4. A method of using an infant car seat harness retraction system, comprising:

obtaining an infant car seat harness retraction system, including:
- a cord locking device having one locking aperture;
- an elastic cord having an elastic cord medial portion disposed between uncoupled elastic cord first and second ends;
- a first bead slidely engaged on said elastic cord medial portion, said elastic cord first and second ends passed through said one locking aperture of said cord locking device to form a cord loop in said elastic cord medial portion, said first bead sufficient large to prevent passage of said cord loop through said one locking aperture; and
- a second bead slidely engaged on said elastic cord first end
    - said system further consisting of only one clip, said clip coupled to said elastic cord second end; and obtaining an infant car seat including a seat and a harness, said harness including shoulder straps which removably engage a harness buckle;

encircling said cord loop about said harness buckle;

adjusting a cord loop opening defined by said cord loop by drawing said uncoupled elastic cord first or second end through said cord locking device; and attaching said clip to said seat.

5. The method of claim 4, further comprising engaging said harness buckle with said shoulder straps.

6. The method of claim 5, further comprising adjusting length of said elastic cord second end between said cord locking device and said clip by drawing said uncoupled elastic cord first or second end through said cord locking device, said elastic cord second end disposed in a stretched condition between said cord locking device and said clip to draw said harness buckle away from said shoulder straps upon said shoulder straps being disengaged from said harness buckle.

7. The method of claim 6, further comprising disengaging said harness buckle from said shoulder straps, said harness buckle drawn away from said shoulder straps by return of said elastic cord second end to an unstretched condition.

8. The method of claim 7, wherein said cord locking device has one locking aperture, and further comprising drawing said elastic cord first and second ends through said one locking aperture of said cord locking device.

9. The method of claim 4, further comprising forming a first knot at said elastic cord first end to retain said second bead slidely engaged on said elastic cord first end.

10. The method of claim 9, further comprising forming a second knot at said elastic cord second end to retain said clip on said elastic cord second end.

* * * * *